United States Patent [19]
Didillon et al.

[11] Patent Number: 5,955,397
[45] Date of Patent: Sep. 21, 1999

[54] SELECTIVE HYDROGENATION CATALYSTS CONTAINING PALLADIUM, ALSO TIN AND/OR LEAD, AND THE PREPARATION AND USE THEREOF

[75] Inventors: Blaise Didillon, Rueil Malmaison; Charles Cameron, Paris; Christophe Gautreau, Rueil Malmaison, all of France

[73] Assignee: Institut Francais du Petrole, Rueil Malmaison Cedex, France

[21] Appl. No.: 08/964,129

[22] Filed: Nov. 6, 1997

[30] Foreign Application Priority Data

Nov. 7, 1996 [FR] France .................................. 96 13576

[51] Int. Cl.⁶ ...................................... B01J 23/44
[52] U.S. Cl. .......................... 502/339; 502/325; 502/332; 502/333; 502/527.14
[58] Field of Search ..................... 502/325, 332, 502/333, 339, 527.14

[56] References Cited

U.S. PATENT DOCUMENTS

| | | | |
|---|---|---|---|
| 3,691,102 | 9/1972 | Swift | 502/325 |
| 3,844,935 | 10/1974 | Drehman et al. | 208/79 |
| 3,900,386 | 8/1975 | Hayes | 208/111 |
| 4,051,073 | 9/1977 | Hegedus et al. | 423/213.2 |
| 4,169,815 | 10/1979 | Drehman | 502/325 |
| 4,221,738 | 9/1980 | Imai | 502/325 |
| 4,459,372 | 7/1984 | Arena | 502/351 |
| 5,858,908 | 1/1999 | Bogdan et al. | 502/227 |

FOREIGN PATENT DOCUMENTS

| | | |
|---|---|---|
| 0 258 942 | 3/1988 | European Pat. Off. . |
| 0 623 387 | 11/1994 | European Pat. Off. . |
| 34 02 321 | 8/1984 | Germany . |
| 2 269 116 | 2/1994 | United Kingdom . |

*Primary Examiner*—Elizabeth D Wood
*Attorney, Agent, or Firm*—Millen, White, Zelano & Branigan, P.C.

[57] ABSTRACT

A particulate selective hydrogenation catalyst for transforming unsaturated diolefinic hydrocarbons to α-olefinic hydrocarbons is described, for the hydrogenation of diolefinic compounds to α-olefinic compounds at rates which are at least 1.5 times higher than the rate of hydrogenation of α-olefinic hydrocarbons to saturated compounds. The catalyst contains palladium distributed at the periphery of particles (spherules or extrudates), and at least one element selected from tin and lead. Further, the tin and/or lead is advantageously distributed at the periphery of the spherules or extrudates. The catalyst preparation is also described, as well as a process for selective hydrogenation of diolefins to α-olefins using the catalyst.

15 Claims, No Drawings

SELECTIVE HYDROGENATION CATALYSTS CONTAINING PALLADIUM, ALSO TIN AND/OR LEAD, AND THE PREPARATION AND USE THEREOF

FIELD OF THE INVENTION

The present invention concerns a selective hydrogenation catalyst for transforming unsaturated diolefinic hydrocarbons to α-olefinic hydrocarbons, in particular for the hydrogenation of diolefinic compounds to α-olefinic compounds at rates of at least 1.5 times higher, normally at least 3 times higher or even 5 times higher than the rate of hydrogenation of α-olefinic compounds to saturated compounds. The catalyst contains palladium and at least one element selected from tin and lead.

The invention also concerns the preparation of such a catalyst, and a process for selective hydrogenation of diolefins to α-olefins using the catalyst.

BACKGROUND OF THE INVENTION

Hydrocarbon conversion processes, for example steam cracking, visbreaking, catalytic cracking and coking, are carried out at high temperatures to produce a wide variety of olefinic compounds such as ethylene, propylene, n-butene-1, n-butene-2 compounds, isobutene or pentenes, and diolefinic compounds such as 1,2-propadiene, 1,3-butadiene and other compounds with boiling points in the "gasoline" cut range and which can be olefinic or diolefinic. Such processes inevitably lead, however, to the formation of highly unsaturated compounds such as diolefins (for example 1,2-propadiene), also alkynes (for example acetylene, propyne, 1-butyne, etc.). Such compounds have to be eliminated to allow the different cuts from these processes to be used in the chemical industry or for polymerisation processes. As an example, the $C_4$ cut from steam cracking contains a high proportion of 1,3-butadiene, butene-1, butene-2 compounds and isobutene.

Conventionally, butadiene is separated from the olefinic cut, for example by extractive distillation in the presence of dimethylformamide or N-methylpyrrolidone. The olefinic cut thus obtained contains isobutane, isobutene, butene-1, butene-2 compounds, n-butane and 1,3-butadiene, the latter being in an amount which can be between 0.1% to 2% by weight.

SUMMARY OF THE INVENTION

If butadiene is not an upgraded product, the cut can be directly treated using catalyst in the presence of hydrogen to transform the butadiene into n-butenes.

If the butene-1 and isobutene are desired products, processes must be used which produce a large quantity of butene-1 and separate different compounds, such as selective hydrogenation of butadiene to butenes with a small amount of isomerisation of butene-1 to butene-2, or separation of the isobutene by etherification with methanol to produce methyl-tertiobutyl ether.

There is currently a large demand for butene-1. This compound is used as a monomer in the polymer industry. Such use necessitates almost complete hydrogenation of butadiene, the presence of which is only tolerated in amounts of less than 10 ppm by weight.

Attaining these low butadiene contents with conventional catalysts based on nickel or palladium means a reduction in the butene-1 content due to butane formation and isomerisation of butene-1 to butene-2. In order to inhibit isomerisation of butene-1 to butene-2 compounds, some bimetallic formulae comprising palladium and a different metal have been proposed. In particular, palladium-silver systems can be cited, such as those described in U.S. Pat. No. 4,409,410, or palladium-gold, palladium-zinc, palladium-copper, palladium-cadmium, or palladium-tin systems, such as those described in Japanese patent application JP-A-87/05 4540. Proposed solutions for limiting consecutive hydrogenation, and thus butane formation, are more limited. As described in the literature (see, for example, "Selective Hydrogenation Catalysts and Processes: Bench to Industrial Scale", J. P. Boitiaux et al., in "Proceedings of the DGMK Conference", 11–13 November 1993, Kassel, Germany), the hydrogenation selectivity for converting highly unsaturated compounds (diolefins or acetylenic compounds) to olefins originates from considerable complexation of the unsaturated compound on the palladium, preventing the olefins from accessing the catalyst and thus preventing their transformation to paraffins. This is clearly illustrated in the publication cited above where 1-butyne is selectively transformed to butene-1 on a palladium leased catalyst. However, it should be noted that the rate of hydrogenation is relatively low. When all of the acetylenic compound has been converted, butane-1 hydrogenation is carried out at a much higher rate than the hydrogenation of the acetylenic compound. This phenomenon is also encountered with selective hydrogenation of butadiene.

This phenomenon poses several problems in industrial units. Firstly, in order to meet specifications regarding butadiene in the olefinic cut, a large quantity of butene-1 is transformed to butane since when the residual concentration of butadiene is low, the hydrogenation rates of butadiene and butene-1 are close to each other. Developing a catalyst which can allow butadiene hydrogenation at a rate which is much higher than the rate of butene-1 hydrogenation, whether these compounds are alone or mixed, is thus very important. This corresponds to catalyst properties which allow hydrogenation with high rate constant ratios for the hydrogenation of butadiene over that of butenes.

The importance of such a catalyst is not limited to an increase in butene-1 selectivity but it can also allow better control of the hydrogenation process. In the event of minor local hydrogen distribution problems, using such a catalyst would not lead to high conversion of butenes to butane and would thus minimise the problems of high exothermicity linked to these poorly controlled hydrogenation reactions which would aggravate distribution problems.

To solve this problem, it was important to develop a hydrogenation catalyst which could hydrogenate 1,3-butadiene to butenes while inhibiting the isomerisation of butene-1 to butene2 and which was less active for consecutive hydrogenation of butene-1 to butane.

We have now discovered that catalysts constituted by palladium and at least one element M selected from tin and lead, have a 1,3-butadiene to butene-1 hydrogenation rate which is at least one and a half times higher, usually 3 times higher or even 5 times higher than the rate of hydrogenation of butene-1 to butane, whether these compounds are hydrogenated mixed together or separately, Further, these catalysts can inhibit isomerisation of butene-1 to butene-2 compounds.

The aim of the invention is thus to provide a composition of matter which can hydrogenate diolefinic compounds to α-olefinic compounds.

A further aim of the present invention is to provide a composition of matter which can produce a diolefins/α-olefins hydrogenation rate ratio of at least 1.5:1.

A third aim of the present invention is to provide a composition of matter with good selectivity towards butene-1 with respect to all n-butenes during hydrogenation of 1,3-butadiene.

The invention thus provides a hydrogenation catalyst characterized in that it comprises particles of a porous support and, as active elements, palladium distributed at the periphery of the particles and at least one element M selected from tin and lead.

Preferably, a proportion of at least 80% of the palladium is comprised in the volume of the particles (for example spherules or extrudates) constituting the catalyst which is defined between the periphery of the particles and a depth of 500 μm, as shown in the following cross sectional diagram:

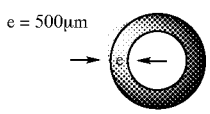

e = 500μm

The palladiums content in the catalyst is in the range 0.025% to 1.0% by weight, preferably in the range 0.03% to 0.5% by weight. The clement M (tin and/or lead) content in the catalyst is generally in the range 0.05% to 4% by weight, preferably 0.2% to 4% for tin and 1% to 4% by weight for lead. The element M/palladium atomic ratio is advantageously in the range 0.1 to 3.

The support in the hydrogenation catalyst of the invention can be selected from the group of compounds including aluminas, silicas, silico-aluminates and clays. Low acidity supports are preferred, such as silicas, aluminas with low specific surface areas, or aluminosilicates exchanged with alkalis.

The support can, for example be an alumina in a particulate form, for example in the form of spherules, extrudates, or in pellets. It can, for example, be in the form of spherules with an average diameter which is generally in the range 2 to 4 mm.

The characteristics of the alumina are, by way of example and without limitation, as follows:

a specific surface area in the range 5 to 200 m$^2$/g, preferably in the range 10 to 70 m$^2$/g; and a pore volume of 0.3 to 0.95 cm$^3$/g. (These characteristics are determined using analysis techniques which are known to the skilled person).

In order to obtain the palladium distribution in the catalyst particles which is in accordance with the definition of the invention, impregnation techniques using an aqueous or organic solution of a palladium precursor can be used, for example. This precursor is preferably an inorganic compound, such as palladium chloride or palladium nitrate.

If the palladium is introduced by impregnation using an aqueous palladium salt solution, the pH of the solution is advantageously more than 0.8.

The element M (tin and/or lead) can also be introduced, for example, by impregnation using an aqueous or organic solution of a precursor of element M. Acetates, chlorides, alkyl complexes, nitrates or alcoholates can be used, for example. Examples of alkyl complexes are tetrabutyl tin or tetrabutyl lead.

The two metals can be introduced from a common solution of two precursors or from separate solutions. In the latter case, drying, calcining or reduction treatments at temperatures in the range 120° C. to 900° C. can optionally be carried out between the two impregnation stages.

The distribution of metal M in the catalyst particles, for example spherules or extrudates, preferably corresponds to that defined for palladium, i.e., at least 80% of the tin and/or lead being comprised in the volume of the particle, for example spherule or extrudate, constituting the catalyst which is defined between the periphery of the particle and a depth of 500 μm as described above.

The catalyst obtained is generally dried at temperatures in the range from ambient temperature to 150° C. The dried catalyst can be used as is; normally, it is calcined to decompose the metallic precursors and/or to reduce it before it use. Calcining is generally carried out by treating the catalyst in a stream of air at a temperature in the range 400° C. to 900° C. Reduction can be carried out by treating the catalyst with a gas containing, hydrogen, for example at a temperature in the range from ambient temperature to 500° C.

The selective hydrogenation process using the catalysts of the invention can be carried out under the usual conditions.

The feed constituted generally by a $C_4$ cut originating from a steam cracking operation passes through a fixed bed of catalyst, at a temperature which is generally in the range 40° C. to 100° C., at a pressure of 5 to 40 bar, preferably 10 to 30 bar, and at an hourly space velocity of 1 to 20 h$^{-1}$, preferably 4 to 10 h$^{-1}$.

The following non limiting examples illustrate the invention.

EXAMPLE 1 (comparative)

A palladium based catalyst A was prepared by impregnating 100 g of an alumina support with 60 ml of a solution of palladium nitrate dissolved in nitric acid (pH=2) to obtain a final catalyst containing 0.3% by weight of palladium. The support was in the form of 2 mm diameter spherules; its specific surface area was 60 m$^2$/g and its pore volume was 0.6 ml/g. After impregnation the catalyst was dried at 120° C., calcined at 450° C. and reduced for 2 hours at 150° C.

Castaing microprobe analysis showed that the distribution of the palladium in the catalyst spherules was in accordance with the invention.

A portion of catalyst A (1.00 g) was introduced into a perfectly stirred reactor containing 10 g of 1,3 -butadiene and 100 g of n-heptane. The reactor was then purged with hydrogen and brought to a hydrogen pressure of 10 bar at 20° C., with stirring, The experimental apparatus was such that spherules of catalyst could be used without the spherules suffering attrition during the test (by using a Carbery type basket). The experimental system allowed a constant pressure to be used, it allowed the hydrogen consumption to be measured as a function of time and it allowed removal of liquids at regular intervals for chromatographic analysis to determine the composition of the medium.

Different parameters were defined from these data:

the butene-1 selectivity, $S_{B1}$, which corresponded to the ratio (butene-1)/(Σn-butenes) at 80% butadiene conversion;

the butadiene hydrogenation rate, $K_{hd}$, which corresponded to the slope of the straight line obtained when plotting the number of moles of butadiene against time for butadiene conversions of less than 80%; and the butene-1 hydrogenation rate, $K_{b1}$, which corresponded to the slope of the straight line obtained when plotting the number of moles of butene-1 against time when all of the butadiene has been converted.

The results obtained under these conditions arc shown in the following table:

| Catalyst | $K_{bd}$ mol/min/g | $K_{b1}$ mol/min/g | $S_{B1}$ (80%) | $K_{bd}/K_{b1}$ |
|---|---|---|---|---|
| A | $1.71 \times 10^{-2}$ | $1.75 \times 10^{-2}$ | 58 | 0.98 |

These results show that the monometallic palladium based catalyst produced butadiene and butene-1 hydrogenation rates which are close to each other (ratio $K_{bd}/K_{b1}$ is close to 1).

EXAMPLE 2 (in accordance with the invention)

Two catalysts (catalysts B and C) based on palladium and tin were prepared from 100 g of catalyst A. The tin was introduced by impregnating with 60 ml of a solution of tetrabutyl tin containing the desired quantity of that element. The catalysts were then dried at 120° C., calcined at 450° C. and reduced for 2 hours at 150° C.

Castaing microprobe analysis showed that the tin concentration profile in samples B and C was parallel to that of the palladium obtained in Example 1.

The activity of catalysts B and C containing different tin contents was then evaluated tinder the conditions described in Example 1.

The parameters used to compare the different catalysts were the same as those defined in Example 1. The results obtained under those conditions are shown in the following table.

| Catalyst | Sn content (wt %) | $K_{bd}$ mol/min/g | $K_{b1}$ mol/min/g | $S_{B1}$ (80%) | $K_{bd}/K_{b1}$ |
|---|---|---|---|---|---|
| B | 0.10 | $9.2 \times 10^{-3}$ | $1.14 \times 10^{-2}$ | 62 | 0.81 |
| C | 0.53 | $4.0 \times 10^{-3}$ | $6 \times 10^{-4}$ | 62 | 6.67 |

Catalyst C, which contained 0.53% by weight of tin, thus allowed butadiene hydrogenation at a rate which was at least five times higher than the rate of hydrogenation of butene-1.

EXAMPLE 2 bis

A catalyst Cbis based on palladium and tin was prepared according to the following protocol:

100 g of the support described in Example 1 was impregnated with an aqueous tin (II) acetate solution The volume of solution used corresponded to the volume of the support and the concentration of tin in the solution was adjusted to obtain a final tin content of 0.53% by weight with respect to the support. The sample was then dried at 120° C. and calcined at 450° C.

Castaing microprobe analysis showed than the tin was homogeneously distributed in the grains of catalyst.

Palladium was then deposited on this catalyst using the same impregnation technique as that described in Example 1. The final palladium content was 0.3% by weight.

The activity of catalyst Cbis was then evaluated under the conditions described in Example 1. The results obtained under those conditions are shown in the following table:

| Catalyst | Sn content (wt %) | $K_{bd}$ mol/min/g | $K_{b1}$ mol/min/g | $S_{B1}$ (80%) | $K_{bd}/K_{b1}$ |
|---|---|---|---|---|---|
| Cbis | 0.53 | $8.0 \times 10^{-3}$ | $4.2 \times 10^{-3}$ | 62 | 1.9 |

Catalyst Cbis, which contained 0.53% by weight of tin, thus allowed hydrogenation of butadiene at a rate at least 1.5 times higher than the rate of butene-1 hydrogenation. In contrast, the $K_{hd}/K_{b1}$ ratio was lower than that obtained with catalyst C.

EXAMPLE, 2 ter (comparative)

A catalyst Cter based on palladium and tin was prepared according to the following protocol:

100 g of the support described in Example 1 was impregnated with an organic palladium bis-acetylacetonate solution. The volume of solution used corresponded to five times the volume of the support and the concentration of palladium in the solution was adjusted to obtain a final palladium content of 0.3% by weight with respect to the support. The sample was then dried at 120° C. and calcined at 450° C.

Castaing microprobe analysis showed than the palladium was homogeneously distributed in the grains of catalyst.

Tin was then deposited on this catalyst using the same impregnation technique as that describe in Example 2. The final palladium content was 0.3% by weight.

The activity of catalyst Cter was then evaluated under the conditions described in Example 1. The results obtained under those conditions arc shown in the following table:

| Catalyst | Sn content (wt %) | $K_{bd}$ mol/min/g | $K_{b1}$ mol/min/g | $S_{B1}$ (80%) | $K_{bd}/K_{b1}$ |
|---|---|---|---|---|---|
| Cter | 0.53 | $4.0 \times 10^{-3}$ | $2.9 \times 10^{-3}$ | 60 | 1.4 |

EXAMPLE 3 (in accordance with the invention)

A series of catalysts (catalysts D to J) based on palladium and lead were prepared by impregnating 100 g of alumina support with 60 ml of an aqueous lead nitrate solution. The quantity of lead nitrate was adjusted to produce catalysts with different concentrations of this element, The support had the same characteristics as that used in Example 1. After impregnation, the catalyst was dried at 120° C., then calcined at 450° C. Palladium was introduced by impregnating the catalysts with 60 ml of a solution of palladium nitrate dissolved in nitric acid to obtain a final catalyst containing 0.3% by weight of palladium. The catalysts were then dried at 120° C., calcined at 450° C. and reduced for 2 hours at 150° C.

For catalysts D to J, Castaing microprobe analysis showed that the distribution of palladium in the catalyst spherules was in accordance with the invention. In contrast, no difference was detected in the concentration of lead between the periphery and the core of the catalyst spherules.

The activity of catalysts D to J containing different lead contents was then evaluated under the conditions described in Example 1.

The parameters used to compare the different catalysts were the same as those defined in Example 1. The results obtained under those conditions are shown in the following table:

| Catalyst | Pb content (wt %) | $K_{bd}$ mol/min/g | $K_{b1}$ mol/min/g | $S_{B1}$ (80%) | $K_{bd}/K_{b1}$ |
|---|---|---|---|---|---|
| D | 0.197 | $1.6 \times 10^{-2}$ | 0.021 | 61.5 | 0.76 |
| E | 0.23 | $1.7 \times 10^{-2}$ | $1.7 \times 10^{-2}$ | 61.7 | 1.00 |
| F | 0.5 | $1.4 \times 10^{-2}$ | $1.3 \times 10^{-2}$ | 62.4 | 1.08 |
| G | 0.99 | $9.9 \times 10^{-3}$ | $7.4 \times 10^{-3}$ | 63.2 | 1.33 |
| H | 1.47 | $8.4 \times 10^{-3}$ | $3.4 \times 10^{-3}$ | 62.9 | 2.59 |
| I | 2.43 | $5.4 \times 10^{-3}$ | $7 \times 10^{-4}$ | 63.3 | 7.71 |
| J | 4.41 | $1.9 \times 10^{-3}$ | $2 \times 10^{-4}$ | 63.2 | 9.5 |

Catalysts containing lead concentrations which were over 2% by weight (catalysts I and J) had a butadiene hydrogenation rate which was at least five times higher than the rate of butene-1 hydrogenation.

EXAMPLE 3bis (in accordance with the invention)

A catalyst (Gbis catalyst) based on palladium and lead was prepared from 100 g of catalyst A. Catalyst A was reduced at 150° C., then the lead was introduced by impregnating with 60 ml of a tetrabutyl lead solution containing the desired amount of this element. The catalyst was dried at 120° C., and reduced for 2 hours at 150° C.

Castaing microprobe analysis showed that the lead concentration profile for sample Gbis was parallel to that of palladium obtained in Example 1. The palladium content was 0.3% and the lead content was 0.99% by weight.

The activity of catalyst Gbis was evaluated under the conditions described in Example 1. The results obtained under those conditions are shown in the following table:

| Catalyst | Pb content (wt %) | $K_{bd}$ mol/min/g | $K_{b1}$ mol/min/g | $S_{B1}$ (80%) | $K_{bd}/K_{b1}$ |
|---|---|---|---|---|---|
| Gbis | 0.99 | $4.0 \times 10^{-3}$ | $8.0 \times 10^{-4}$ | 63 | 5.0 |

Catalyst Gbis, which contained 0.99% by weight of lead, thus hydrogenated butadiene at a rate which was at least 1.5 times higher than the rate of butene-1 hydrogenation. Compared with catalyst G, this catalyst had a higher $K_{bd}/K_{b1}$ ratio.

EXAMPLE 4 (comparative)

A catalyst K based on palladium and silver was prepared under the conditions described in U.S. Pat. No. 4,409,410.

Catalyst K was prepared by impregnating 100 g of the alumina used in Example 1 with 60 ml of a solution of nitric acid, palladium nitrate and silver nitrate, to obtain a final catalyst containing 0.3% by weight of palladium and 0.5% by weight of silver. The catalyst was then dried at 120° C., calcined at 450° C. and reduced for 2 hours at 150° C.

The activity of catalyst K was evaluated under the conditions described in Example 1. The results obtained under these conditions are shown in the following table:

| Catalyst | Ag content (wt %) | $K_{bd}$ mol/min/g | $K_{b1}$ mol/min/g | $S_{B1}$ (80%) | $K_{bd}/K_{b1}$ |
|---|---|---|---|---|---|
| K | 0.5 | $1.05 \times 10^{-2}$ | $8.6 \times 10^{-3}$ | 62 | 1.22 |

Catalyst K produced higher butene-1 selectivity compared with the monometallic catalyst, corresponding to the properties described in the patent cited above, but the ratio of rate constants $K_{bd}/K_{b1}$ was close to 1, indicating that in this catalyst, the butadiene hydrogenation rate was practically equivalent to the butene-1 hydrogenation rate.

EXAMPLE 5 (comparative)

A catalyst L based on palladium and gold was prepared under the conditions described in U.S. Pat. No. 4,533,779.

Catalyst L was prepared by impregnating 100 g of the alumina used in Example 1 with 60 ml of a solution of nitric acid and palladium nitrate to obtain a catalyst containing 0.3% by weight of palladium. The catalyst was dried at 120° C., calcined at 300° C. and reduced for 2 hours at 300° C. The catalyst was then impregnated with an aqueous chloroauric acid ($HAuCl_4$) solution to obtain a final catalyst containing 0.5% by weight of gold.

The activity of catalyst L was evaluated under the conditions described in Example 1.

The results obtained under these conditions are shown in the following table:

| Catalyst | Au content (wt %) | $K_{bd}$ mol/min/g | $K_{b1}$ mol/min/g | $S_{B1}$ (80%) | $K_{bd}/K_{b1}$ |
|---|---|---|---|---|---|
| L | 0.5 | $1.16 \times 10^{-2}$ | $1.20 \times 10^{-2}$ | 62 | 0.97 |

Catalyst L produced better butene-1 selectivity compared with the monometallic catalyst, but the ratio of rate constants $K_{bd}/K_{b1}$ was close to 1, indicating that in this catalyst, the butadiene hydrogenation rate was practically equivalent to the butene1 hydrogenation rate.

The preceding examples can be repeated with similar success by substituting the generically or specifically described reactants and/or operating conditions of this invention for those used in the preceding examples.

The entire disclosure of all applications, patents and publications, cited above and below, and of corresponding French application 96/13.576, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

We claim:

1. A selective hydrogenation particulate catalyst, comprising particles of a porous support comprising at least one refractory inorganic oxide, and, as active elements, palladium distributed at the periphery of the support particles and at least one element M being tin or lead, said palladium content being in the range 0.025% to 1.0% by weight of the catalyst and the content of element M being in the range 0.05% to 4% by weight of the catalyst.

2. A selective hydrogenation catalyst according to claim 1, wherein that in the support, at least 80% of the palladium is located in the volume of particles defined between the periphery of the particles and a depth of 500 µm.

3. A selective hydrogenation catalyst according to claim 1, wherein the palladium content is in the range 0.03% to 0.5% by weight of the catalyst.

4. A selective hydrogenation catalyst according to claim 1, wherein metal M is tin and its content in the catalyst is in the range 0.2% to 4% by weight.

5. A selective hydrogenation catalyst according to claim 1, wherein metal M is lead and its content in the catalyst is in the range 1% to 4% by weight of the catalyst.

6. A selective hydrogenation catalyst according to claim 1, characterized in that the element M/palladium atomic ratio is in the range 0.1 to 3.

7. A selective hydrogenation catalyst according to claim 1, wherein in the support, metal M is distributed at the periphery of the particles.

8. A selective hydrogenation catalyst according to claim 2, characterized in wherein in the support, at least 80% of metal M is comprised in the volume of particles defined between the periphery of said particles and a depth of 500 μm.

9. A selective hydrogenation catalyst according to claim 1, wherein said support is selected from the group of compounds comprising aluminas, silicas, silico-aluminates and clays.

10. A selective hydrogenation catalyst according to claim 9, wherein said support consists of an alumina with a specific surface area in the range 5 to 200 m$^2$/g and a pore volume of 0.3 to 0.95 cm$^3$/g.

11. A selective hydrogenation catalyst according to claim 9, wherein in the support, at least 80% of metal M is comprised in the volume of particles defined between the periphery of said particles and a depth of 500 μm.

12. A selective hydrogenation catalyst according to claim 11, wherein said support consists essentially of an alumina with a specific surface area in the range 5 to 200 m$^2$/g and a pore volume of 0.3 to 0.95 cm$^3$/g.

13. A selective hydrogenation catalyst according to claim 1 in the form spherules or extrudates.

14. A selective hydrogenation catalyst according to claim 1 in the form spherule having an average diameter of about 2 mm.

15. A selective hydrogenation particulate catalyst, comprising particles of a porous support comprising at least one refractory inorganic oxide, and, active elements, consisting essentially of palladium distributed at the periphery of the support particles and at least one element M being tin or lead, said palladium content being in the range 0.025% to 1.0% by weight of the catalyst and the content of element M being in the range 0.05% to 4% by weight of the catalyst.

* * * * *